INVENTOR.
MITCHELL J. BOGDANOWICZ
ATTORNEY

INVENTOR.
MITCHELL J. BOGDANOWICZ
ATTORNEY

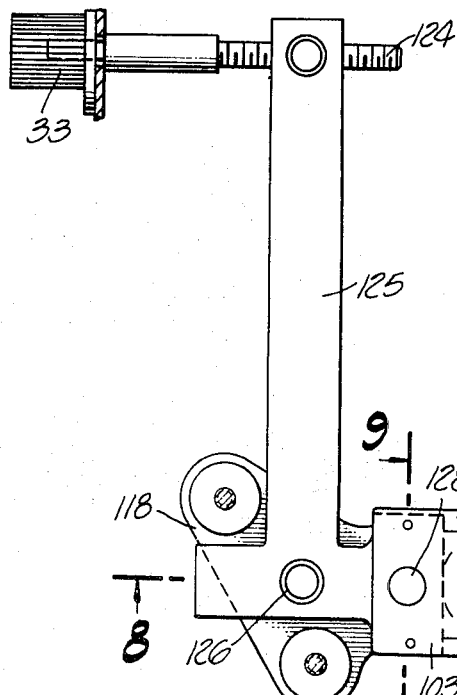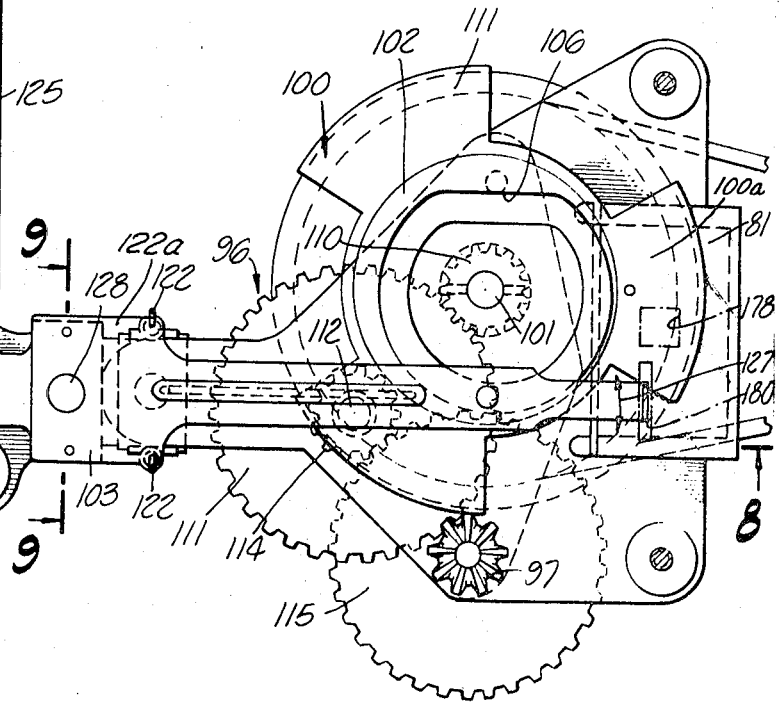

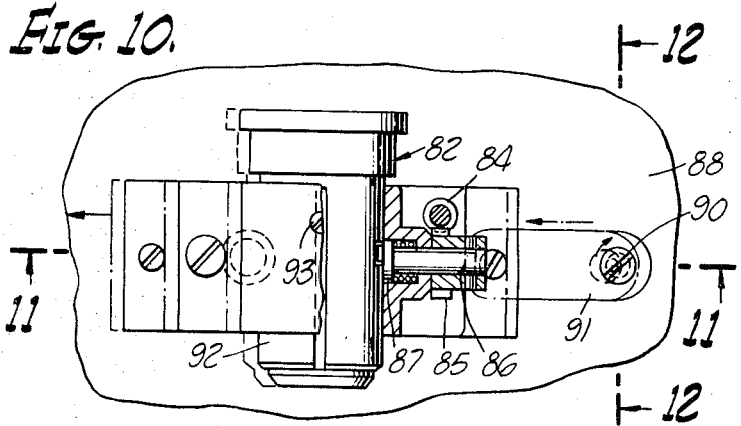
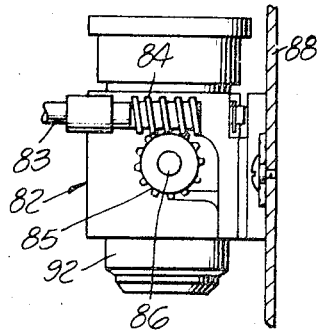
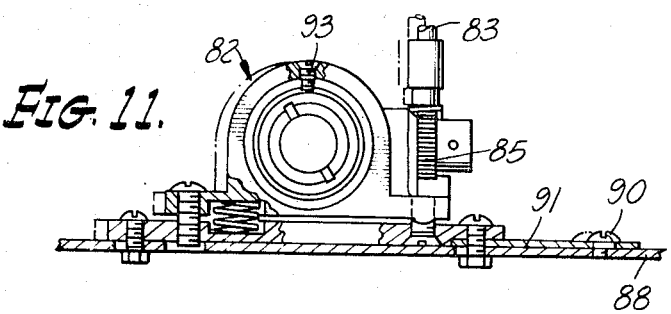
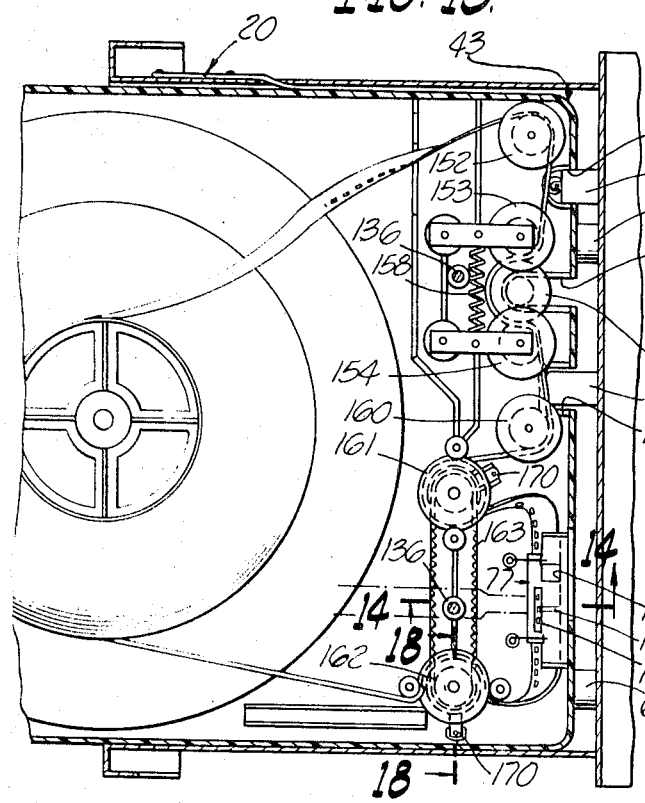
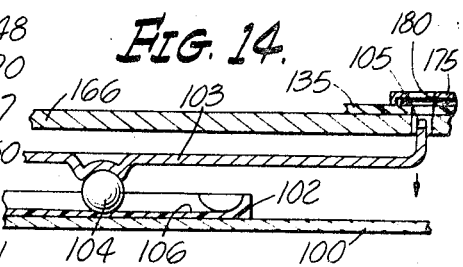
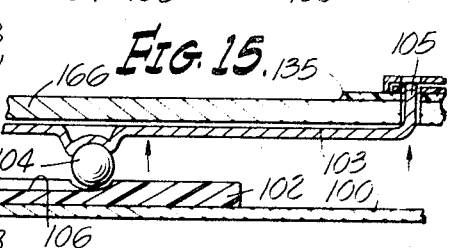
INVENTOR.
MITCHELL J. BOGDANOWICZ
BY
ATTORNEY

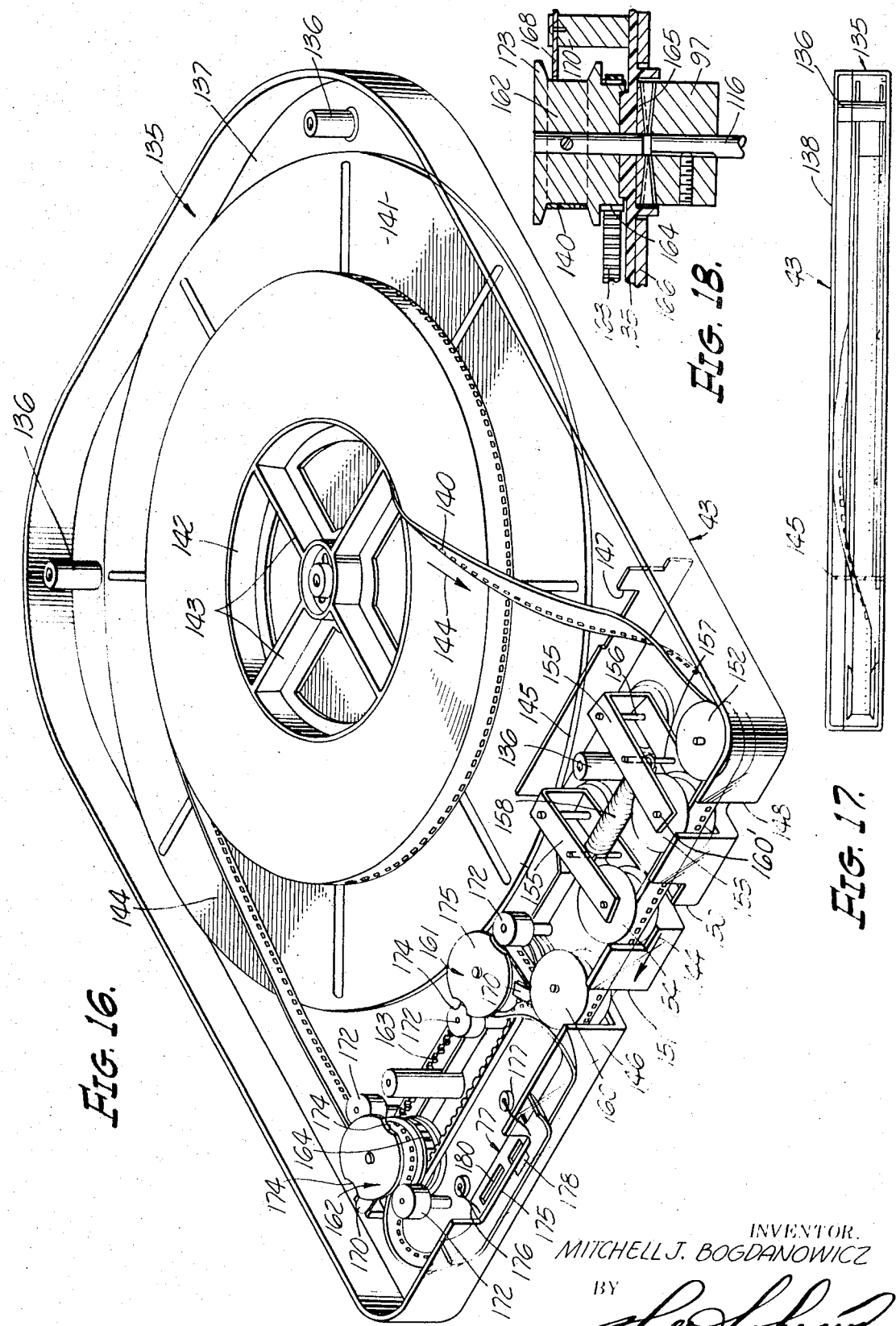

United States Patent Office 3,544,205
Patented Dec. 1, 1970

3,544,205
PROJECTOR FOR CONTINUOUS LOOP MOTION PICTURE FILM
Mitchell J. Bogdanowicz, New York, N.Y., assignor to Jayark Instruments Corporation, New York, N.Y., a corporation of New York
Filed Nov. 28, 1967, Ser. No. 686,083
Int. Cl. G03b 31/02
U.S. Cl. 352—27                                        5 Claims

ABSTRACT OF THE DISCLOSURE

A motion picture projector where the film is contained in a film cartridge in a continuous loop. The film is moved past a sound reproducing device and then past a film gate. In order to cause the film to move at a constant speed, a rotatable idler drum in the projector frictionally engages a pair of idler wheels in the cartridge. The idler drum is connected to a flywheel to prevent sudden changes of the film speed thereby to preserve the fidelity of the sound reproduction. The film is positively driven by a drive sprocket in the film cartridge which is driven by a clutch in the film projector.

BACKGROUND OF THE INVENTION

This invention relates generally to film projectors, and particularly relates to a self-contained portable machine for reproducing pictures and sound on a film contained in a cartridge in a continuous loop.

The film projector of the present invention may be considered to be an improvement of that disclosed and claimed in the patent to Jensen and Goldstone No. 3,271,095, issued on Sept. 6, 1966, entitled Projector for Continuous Sound and Motion Picture Film and assigned to the assignee of the present invention.

Briefly, in order to eliminate the problem of handling and threading motion picture film having a sound track thereon by the average user of a portable, relatively inexpensive motion picture projector, it has been proposed to use a self-contained film cartridge. Such a film cartridge stores and holds a continuous loop of the film. Hence each different motion picture film is in its own film cartridge and the film need not be handled by the user.

Such a film, however, raises the problem of how to drive the film in the cartridge. This film must be moved continuously past a sound reproducer to reproduce the sound track. On the other hand, the film must be moved past the film gate intermittently by a suitable mechanism such as a claw having a pair of claw fingers. In the Jensen et al. patent above referred to, this has been accomplished by moving the film both past the sound reproducer and past the film gate in such a manner that the plane of the film is substantially at right angles to a plane tangential to the film loop. Thus the film moves in a horizontal plane, assuming that the film loop is stored with a plane tangential thereto in a vertical direction. This arrangement much facilitates projecting light through the film.

However, difficulties have been experienced in causing the film to move smoothly and at a continuous speed past the sound reproducer. Such a variation in speed will cause the pitch of the sound to vary in a disagreeable manner, hence impairing the sound fidelity.

SUMMARY OF THE INVENTION

It is accordingly an object of the present invention to provide a portable film projector capable of cooperating with a film cartridge containing a film arranged in a continuous loop so that the film moves continuously at a constant speed past a sound reproducer so as to preserve the fidelity of the recorded sound.

Another object of the invention is to provide a film projector of the character referred to which permits to move the film in the cartridge positively by means of a sprocket wheel in the cartridge, the sprocket wheel being driven by a rotating clutch in the projector.

A further object of the invention is to provide a film projector of the type above discussed wherein a flywheel is utilized in connection with an idler drum to prevent sudden variations of the film speed past the sound reproducer to avoid sudden changes of the pitch of the sound.

A projector in accordance with the present invention serves the purpose of projecting motion picture film and of reproducing a sound track on the film, the film having sprocket holes. The film is contained in a film cartridge in a continuous loop. The projector includes a housing having an aperture for receiving the film cartridge. The cartridge has a portion defining a first film path for reproducing the sound track on the film and a second film path for projecting film frames.

A rotatable idler drum is disposed in the housing to frictionally engage a pair of idler wheels in the cartridge and in the first film path. Further a single clutch is disposed in the housing to engage and drive a sprocket wheel in the cartridge which in turn is arranged along the second film path. This clutch is the only driving means for continuously driving the film in the cartridge.

Preferably a flywheel is provided in the housing and connected to the idler drum for rotation therewith. This flywheel provides a mass connected to the idler drum which has sufficient inertia to substantially prevent sudden variations of the film speed when the cartridge is connected to the projector.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 7 is a horizontal detail view on enlarged scale taken on line 7—7 of FIG. 5 and illustrating particularly the shutter and gear drive, the claw which intermittently advances the film and the adjustment of the claw which adjusts the position of the film frames;

FIG. 8 is a sectional view taken on line 8—8 of FIG. 7;

FIG. 9 is a view on enlaged scale taken on line 9—9 of FIG. 7 and illustrating the relative adjustment between the film advancing claw and its cam;

FIG. 10 is a detail view of the projection lens and its adjusting mechanisms;

FIG. 11 is a sectional view taken on line 11—11 of FIG. 10;

FIG. 12 is an elevational and sectional view taken on line 12—12 of FIG. 10;

FIG. 13 is a top plan view of the film cartridge in position in the film projector with the cartridge cover removed;

FIG. 14 is a side elevational view, taken on line 14—14 of FIG. 13 and illustrating the intermittent film advancing claw and its cam follower and cam, the claw being shown in the retracted position;

FIG. 15 is a side elevational view identical to that of FIG. 14, except that the claw is shown in its sprocket hole engaging position;

FIG. 16 is a view in perspective of the film cartridge with the cover removed, the cartridge being shown disengaged from the film projector;

FIG. 17 is a side elevational view on reduced scale of the catridge of FIG. 16 together with its cover; and FIG. 18 is a sectional view on enlarged scale taken on line 18—18 of FIG. 13 and illustrating the clutch for driving the drive sprocket in the cartridge.

DESCRIPTION OF THE PREFERRED EMBODIMENTS

Figure 1:
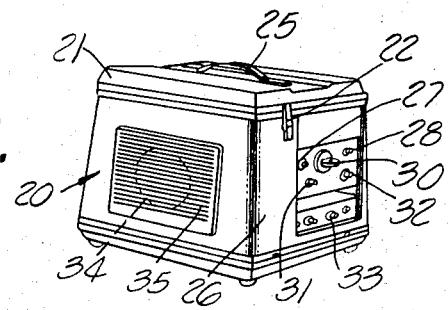
FIG. 1 is a view in perspective of a film projector.

Referring now to the drawings and particularly to FIGS. 1 through 12, 14, 15 and 18, there is illustrated a film projector claimed in the present application. The film cartridge illustrated in FIGS. 13, 16 and 17 is claimed in the copending patent application entitled Cartridge for Continuous Loop Film filed concurrently herewith in the name of the inventor of the present application and assigned to the assignee of the present application. This film projector is particularly adapted to use a new 8 mm. motion picture film which is sold in the trade by Eastman Kodak Corp. under the name of Super 8. This film has smaller size sprocket holes than the conventional 8 mm. motion film. Instead of moving 18 feet per minute as does the old film, it moves at 20 feet per minute with correspondingly larger frames. As is conventional, 24 frames are projected per second, each frame being projected three times to provide an apparent projection rate of 72 pictures per second to eliminate flicker.

Figure 2:
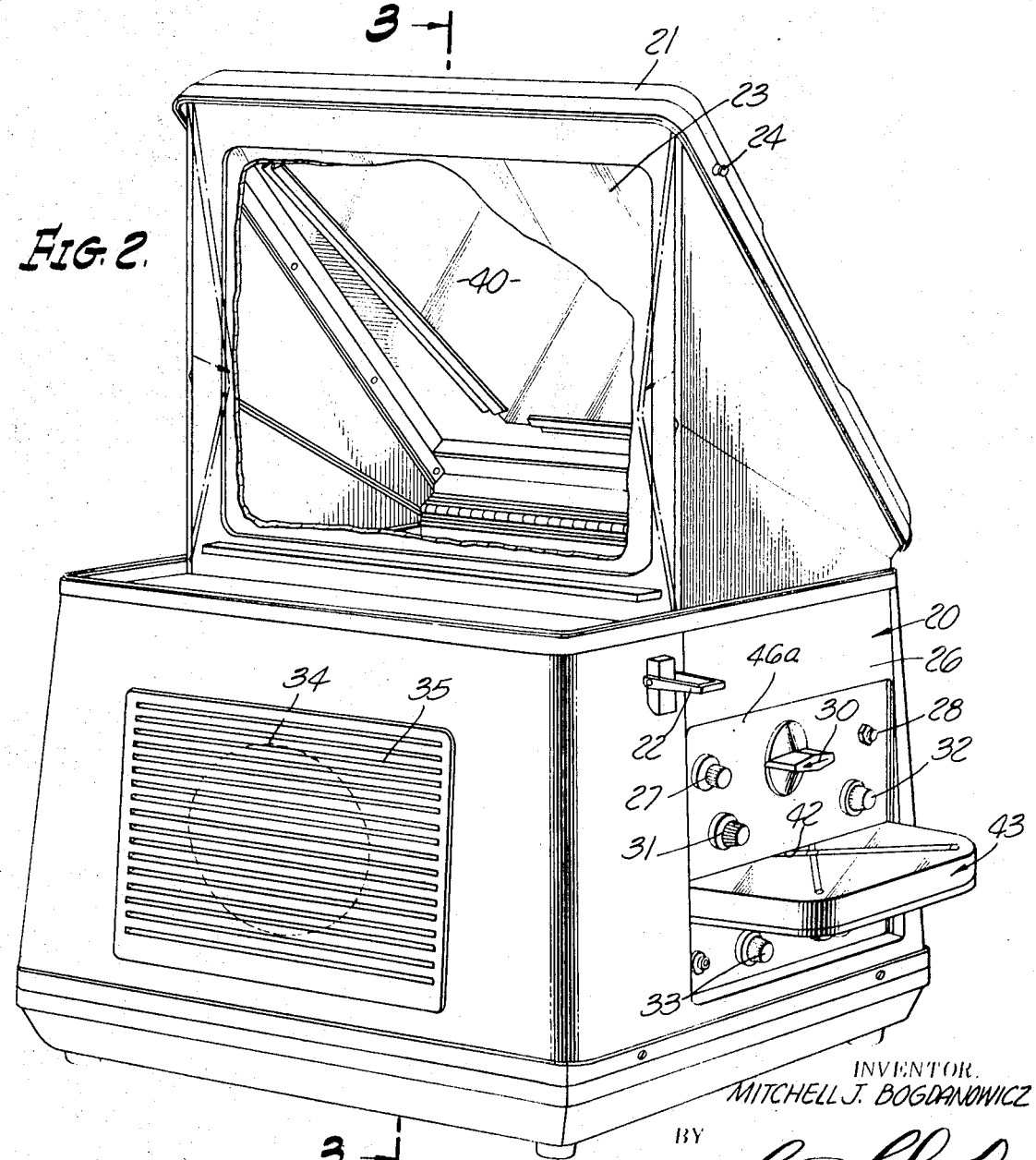
FIG. 2 is a view in perspective, on enlarged scale, of the film projector of FIG. 1 with its top raised showing the screen in its operative position and further showing a film cartridge partly inserted into the projector.

As shown particularly in FIGS. 1 and 2 the projector is provided with a housing 20 having a top 21 which may be raised as shown in FIG. 2 to rotate a screen 23 into its operating position. The top 21 may be secured to the housing 10 in the inoperative position by a catch 22 engaging a pin 24 in the top 21. A handle 25 forming a loop is disposed at the top 21 to facilitate carrying of the projector.

The side wall 26 of the housing 20 carries the operating controls. These include a volume control knob 27 for controlling the sound volume, a start button 28, a lever 30 for releasing or locking the film cartridge, a tone control knob 31, a picture focus adjustment knob 32 and a picture framing control knob 33. There may also be a female outlet for receiving a plug carrying house current and a fuse. The operation of these controls will be subsequently explained, except for the volume and tone controls which together with the sound amplifier reproduction system form no part of the present invention. The sound is reproduced by a loudspeaker 34 covered by a grille 35.

Figure 3:
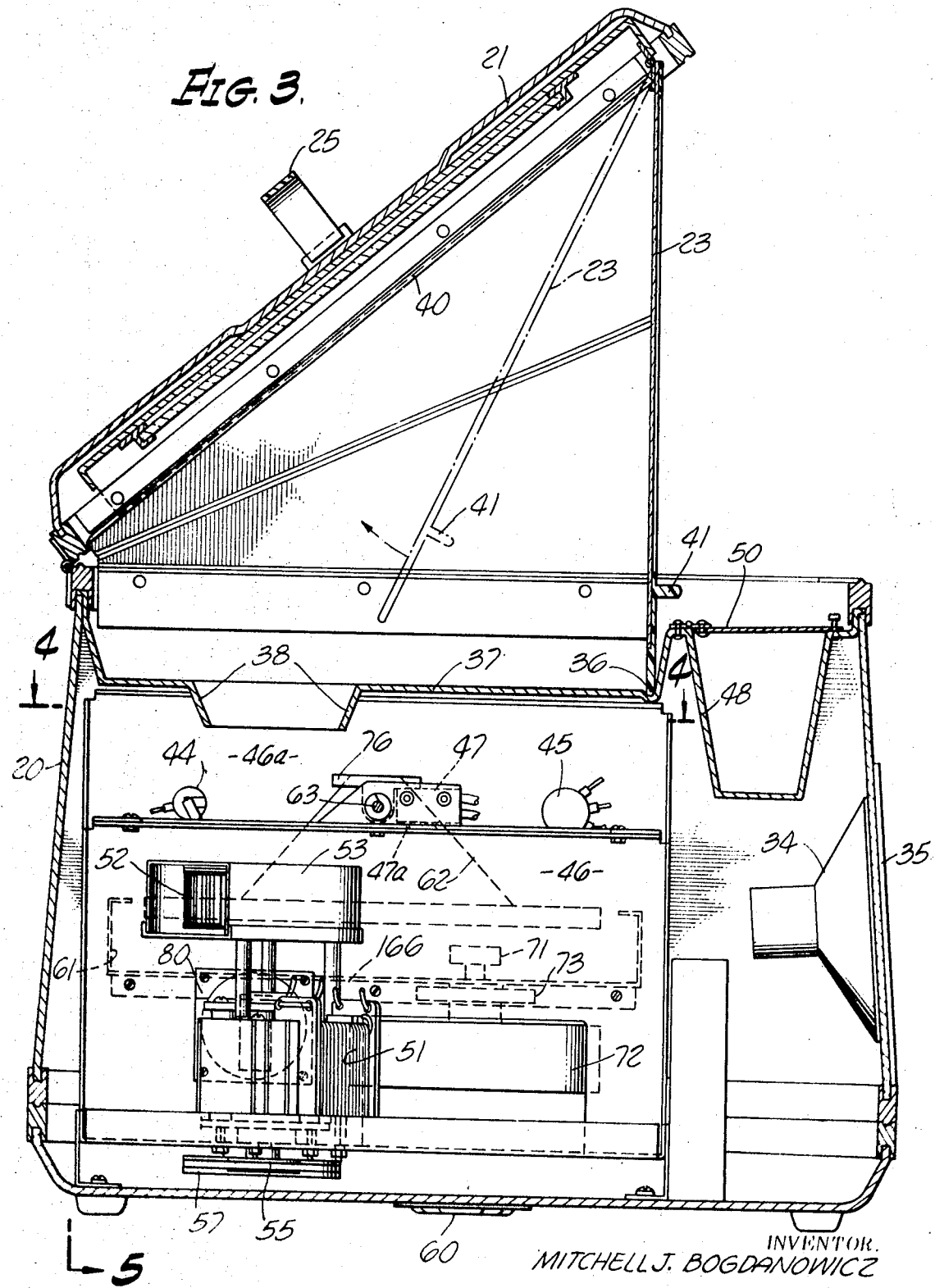
FIG. 3 is a vertical sectional view taken on line 3—3 of FIG. 2.
Figure 4:
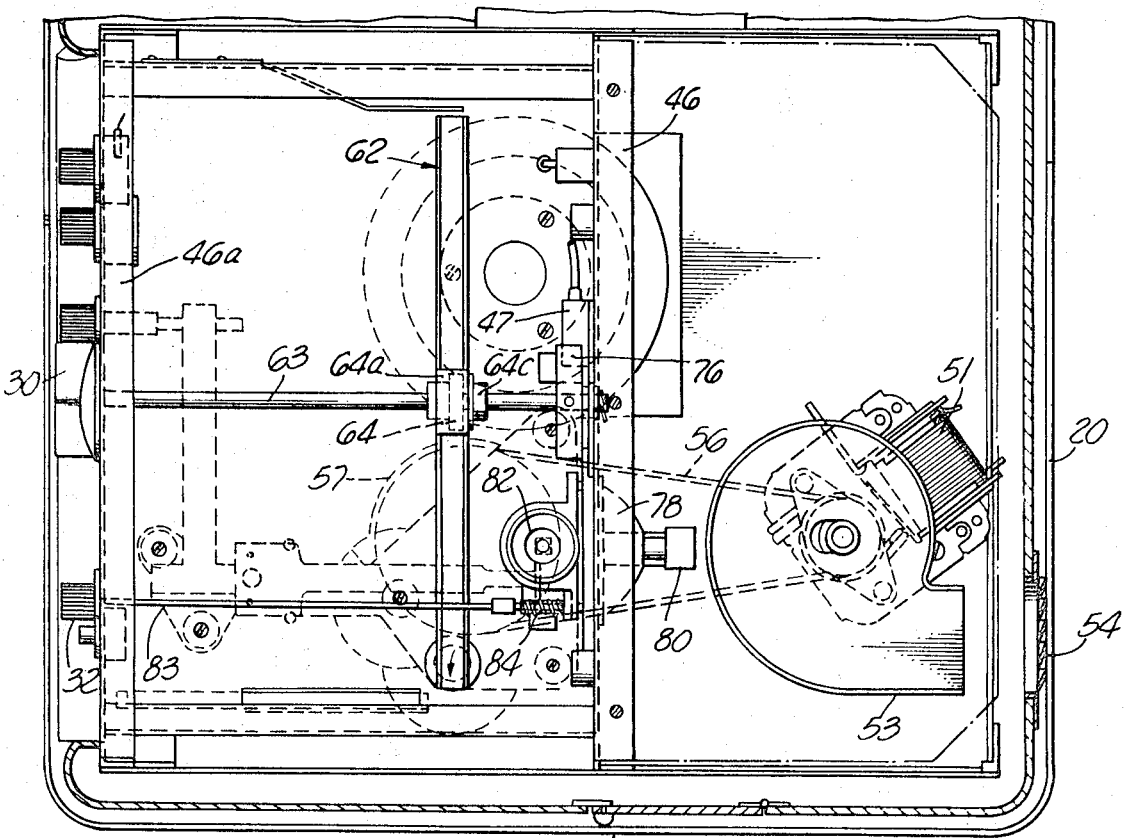
FIG. 4 is a horizontal sectional view taken on line 4—4 of FIG. 3.
Figure 5:
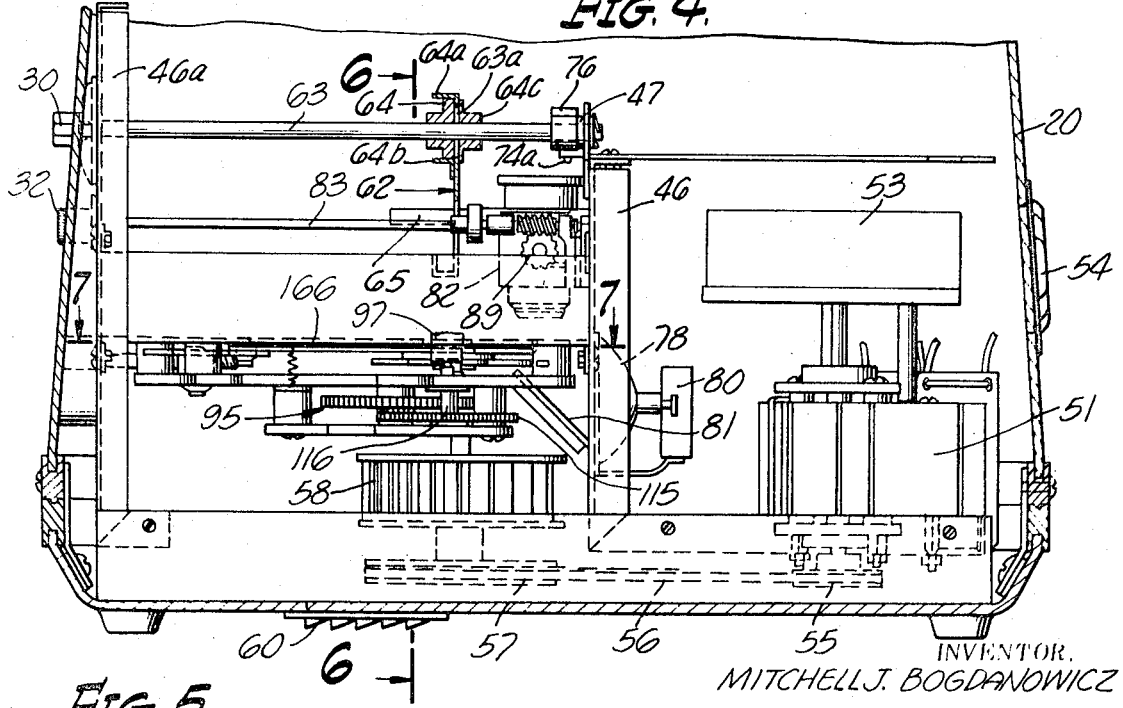
FIG. 5 is a vertical sectional view taken on line 5 of FIG. 3, parts being broken away.

As clearly shown in FIG. 3 the screen 23 is adapted to be retracted into the top 21 when the top is folded down. In the operating position the screen 23 engages a longitudinal recess 36 in a light shield 37 secured to the housing 20 and forming an open cone 38. The cone 38 defines a light path for the light from a film frame onto a mirror 40 disposed in the top 21. The screen 23 may have a projecting part or handle 41 which permits to position the screen when the top is raised. On the side wall 26 of the housing 20 there is provided an opening 42 for permitting a film cartridge 43 to be inserted.

A start switch 44 operated by the start button 28 and a volume potentiometer 45 controlled by the volume control knob 27 are disposed on an intermediate partition 46a. The partition 46 supports a microswitch 47 operated by the cartridge lock-down assembly, as will be explained subsequently. A compartment 48 having a lid 50 may be formed in the housing 20 and may be secured to the light shield 37. It may be used to hold auxiliary equipment such as an electric cord or the like.

An electric motor 51 furnished the electric power for all driven elements. It drives the film continuously past the sound reproducing device and intermittently past the film gate, and also operates the film shutter. The motor 51 also drives a blower 52 in a housing 53 which exhausts the hot air through a set of louvers or vents 54 (see FIGS. 4 and 5) in the housing 20. The motor 51 drives a motor pulley 55 through a drive shaft. As shown particularly in FIGS. 4 and 5 a drive belt 56 drives a shutter pulley 57 which in turn drives the shutter and a gear train. The shutter pulley 57 also drives another blower 58, which draws cool air through vent 60 in housing 20, and circulates this air to cool the moving parts.

Figure 6:
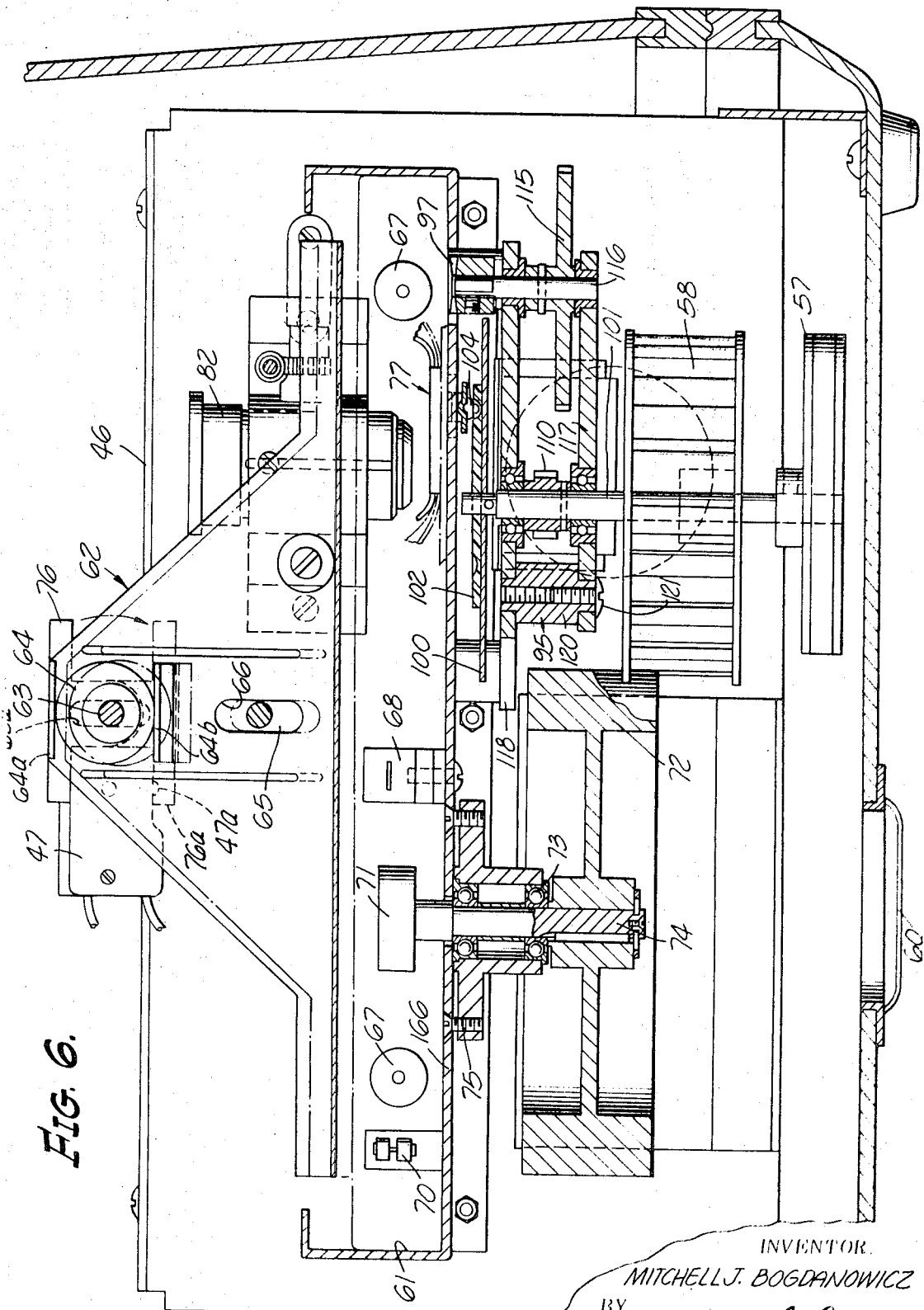
FIG. 6 is a vertical sectional view on enlarged scale, taken on line 6—6 of FIG. 5.

The film cartridge 43 is inserted into a generally U-shape opening 61 shown particularly in FIG. 6. The cartridge 43 may then be locked by a lock-down assembly shown generally at 62. This includes a triangle-shaped lock-down bracket which may be raised or lowered to disengage or press down and lock the film cartridge. To this end the cartridge locking knob 30 rotates a shaft 63 which extends through vertical slot 63a in the vertical wall of 62 on which is fixed an eccentric cam 64. A flanged hub 64c cooperates with cam 64 to hold the parts in proper relationship. Rotation of the cam 64 in turn raises and lowers the lock-down bracket 63 by engagement with flanges 64a and 64b. The lock-down bracket is further guided by a rod 65 in a vertical slot 66. The cartridge is pushed back into the projector against a pair of stops 67. A sound reproducing device such as a pick-up head 68 is positioned to engage the sound track on the film in the film cartridge. An auxiliary magnetic pick-up head 70 is also positioned in the path of the film and serves the purpose of shutting off the electric motor at the end of the motion picture film in response to a special signal secured to the film. An idler drum 71 serves a purpose to be more fully explained hereinafter. It provides friction on the film before it passes the magnetic head 68 and is connected to an appreciable inertia device such as a flywheel 72. The shaft 74 of the flywheel 72 is mounted in ball bearings 73 secured to a chassis wall 166 by a bearing house 75. A switch bar 76 forms part of the lock-down assembly and operates the microswitch 47.

The path of the light through the film gate generally shown at 77 will now be explained. The lamp 78 (see FIGS. 4 and 5) is disposed in a socket 80 and projects light through a fixed mirror 81 and a film frame into a lens assembly 82. From the lens assembly 82 the light is projected onto the mirror 40 (see FIG. 3) and eventually onto the viewing screen 23. The lens assembly 82 is adjustable to provide focusing of the image. To this end the focus knob 32 has a shaft 83 for rotating a worm 84 which meshes a gear 85 as shown particularly in FIGS. 10 to 12. The gear shaft 86 carries an eccentric adjustment cam 87 for raising or lowering the entire lens assembly 82. The lens assembly is fixed to the chassis wall 88 and may be adjusted to the left or right of FIG. 10 by rotating the eccentric screw 90 to move the adjusting strip 91. This will position the lens with respect to the film frames. The lens 92 may be held in position in its mount by means of the guide pin 93.

The film advance mechanism will now be described particularly with reference to FIGS. 5 through 9. The electric motor 51, through the drive belt 56 and the shutter pulley 57 also drives a gear and claw assembly generally shown at 95. The gear assembly includes a gear train 96 for driving a clutch 97 having a frusto-conical surface for engaging with and driving a sprocket wheel in the film cartridge as will be later explained.

Thus a shutter 100 is driven directly by the shaft 101 driven by the pulley 57. The shutter 100 has three ears 100a for periodically interrupting the light path between the light source 78 and the film frames thereby to project each frame three times. A cam 102 is also driven by the drive shaft 101. This cam 102 controls the movement of a claw 103 through a cam follower 104. The cam follower 104 is ball shaped and may be secured to the claw 103, for example by welding, to facilitate the assembly. The claw has two claw fingers 105 for intermittently engaging the sprocket holes in the film and for advancing the film intermittently pass the film gate 77. To this end the cam 102 has a groove 106 for raising and lowering the fingers 105 into and out of the sprocket holes and at the same time for moving the claw laterally to advance the film.

Accordingly the cam groove 106 periodically raises and lowers the claw 103 by having a deeper or shallower groove as clearly shown in FIGS. 14 and 15. On the other hand, the cam groove 106 is substantially annual with a substantially flat portion as clearly shown in FIG. 7. This causes the claw cam to move left and right of FIG. 7 to advance the film periodically. As a result the claw moves in a substantially rectangular fashion without lost motion to engage the sprocket holes, advances the film and disengages the sprocket holes.

The sprocket drive or clutch 97 is driven by a separate gear train. Thus the pinion 110 is secured to the drive shaft 101 and meshes with a large gear 111 on a shaft 112. Another pinion 114 is secured to the shaft 112 and drives a large gear 115 which in turn rotates the clutch 97 by means of a common shaft 116. The entire gear train 110 to 116 is held by a lower gear plate 117 and an upper gear plate 118 which permits to insert or remove the entire gear train as a unit. The entire assembly is held together by a plurality of posts 120 and screws 121. A pair of springs 122 are each secured to the anchor plate 122a and pull the claw 103 against the cam follower 104 and cam 102 to assure engagement between claw and cam.

The adjustment of the claw with respect to the film for the purpose of adjusting the position of each film frame will now be explained with reference to FIGS. 7 to 9. The framing knob 33 may be rotated to rotate a screw 124 in a framing bar 125. This will rotate the bar 125 with respect to a pivot 126 to move the position of the outer end of the claw 103 as shown by the arrow 127. This in turn will adjust the film advancing movement of the claw.

In addition the position of the claw may be adjusted in a lateral direction as viewed in FIG. 7. This is accomplished by the eccentric pin 128 having a screw head 130. The slotted head 130 may be rotated by a screwdriver through the opening 131 in the gear plate 118. Rotating of the eccentric pin 128 will move the claw 103 with respect to the framing bar 125. Ball bearings 132 are provided between the framing bar 125 and the claw 103 to facilitate the up and down movement of the claw.

Before describing the operation of the film projector, it is necessary to described first the film cartridge 43. To this end reference is now made to FIGS. 13 and 16 through 18. FIG. 13 illustrates a portion of the film cartridge 43 inserted into the projector housing 20 and in engagement with the film drive mechanism and the sound reproducing mechanism. FIG. 16 shows the cartridge only with the cover removed while FIG. 17 is a side elevational view of the film cartridge and its cover.

The film cartridge consists of a box-like housing 135 with rounded corners and an upright wall. A plurality of posts 136 are secured to the bottom wall 137 and provided with threaded holes to receive screws, not shown, which secure the cover 138 to the housing 135. The film 140 is disposed in an endless loop on a rotatable plate 141 secured to an upright cylinder 142 on which the film rests and having four arms 143. The film moves as shown by arrows 144. Thus the film 140 is taken off the inner loop and returned to the outside of the film loop.

The film first passes a partition wall 145 extending parallel to the front wall 146 of the cartridge housing 135. The partition wall has a horizontal cut-out 147 to permit the film to pass into the front portion of the cartridge. The cartridge has from right to left along the path of the film, a first opening 148 for the automatic stop pick-up head 70, a second opening 150 for the idler drum 71, and a third opening 151 for the sound pick-up head 68. In other words, these openings make it possible for the pick-up heads 68 and 70 to pass through the cartridge to contact the sound track on the film while the idler drum 71 can pass through the cartridge into frictional contact with two idler wheels to be presently described.

The film 140 after passing over the cut-out 147 moves over a first idler wheel 152 rotatably mounted in the housing 135. The film then passes over two additional idler wheels 153 and 154. The idler wheel 153 is mounted in a U shape bracket 155 pivoted in the housing 135 by a post 156. An intermediate post 157 has attached thereto a spring 158 tending to pull against an identical bracket 155' on which the drum 154 is pivotally mounted. The drum 153 is rotatable on a post 160 in the bracket 155. Accordingly each of the two drums 153, 154 is free to rotate and they are urged toward each other by the spring 158.

As shown in FIG. 13 the two drums 153, 154 are forced apart by the idler drum 71 mounted in the projector. This will increase the friction between the film 140 and the two drums 153 and 154. At the same time since the idler drum 71 is connected to the flywheel 72 they form a mass system with a relatively large inertia. This will prevent rapid variation in the speed of the film moving between the drums 153, 71 and 154 thus preventing variation of the pitch of the sound picked up by the magnetic head 68.

Another idler drum 160 is rotatably disposed in the housing 135 past the sound pick-up opening 151. So far, as clearly shown in the drawings, the film 140 moves along the front portion of the film cartridge in a vertical direction, that is, parallel to a plane tangential to the film loop. However, in order to project the light through the film frames more efficiently and without the necessity of retractable mirrors and the like, the film now moves past the film gate 77 at right angles to the tangential plane. In other words, as viewed in FIG. 16 the film moves in a horizontal plane.

In order to achieve this there are provided two sprocket wheels 161 and 162 in the film cartridge. The sprocket wheels 161 and 162 are rotatably journalled in the housing 135 and serve the purpose to positively drive the film 140 in a vertical plane. The two sprockets are connected by a drive belt 163 engaging a lower gear-like portion 164 of the sprockets. The sprocket wheel 162 is provided with a lower frusto-conical portion 165 engageable with the corresponding portion of the clutch 97 as shown in FIG. 18 which also shows a chassis wall 166. Accordingly the sprocket 162 is driven by the electric motor 51 and the gear train 96, by the clutch 97 and in turn drives the driven sprocket wheel 161.

Each of the two sprocket wheels 161, 162 is provided with a stripper plate 168 and a stripper post 170 (see particularly FIG. 18) secured to the housing 135. The purpose of the stripper post 170 and plate 168 is to prevent the film from wrapping around the sprocket in case the film should break within the cartridge while the motor is running. It also helps to prevent the film loop from wrapping around the sprocket 161 before it enters the film gate 77, and from wrapping around the sprocket 162 before returning to film plate 141.

Each of the sprockets 161 and 162 is provided with a pair of idler rollers 172 which guide the film around the sprockets. The top plate 173 of each sprocket is provided with two semi-circular cut-outs 174 which permit to thread the film around the sprockets 161 and 162 when the film is mounted in the cartridge.

The film gate 77 includes two aperture plates 175, only one of which is shown. They are held down by a pair of spring wires 176 and mounted on a rotatable disk 177 on the housing so that the springs may be rotated to permit lifting of the aperture plates. The two plates 175 have a matching pair of apertures 178 and 180. Apertures 178 are substantially square and permit the light from the lamp 78 to be projected through the apertures 178 and the film frame onto the screen 23. To this end the cartridge housing 135 and cover 138 should either be transparent to light or be provided with suitable openings. The other elongated opening 180 is disposed adjacent the film frames over the sprocket holes in the film to permit the claw fingers 105 to pass through the aperture plates into the sprocket holes to move the film intermittently. From the sprocket wheel 162 the film returns to the film loop in the cartridge.

Having described the film projector and the film cartridge, their operation will now be explained. At first the top 21 of the projector is raised after having opened the catch 22, then the screen 23 is positioned in the recess 36. Then the cartridge 43 is inserted into the opening 42 of the projector and pushed against the cartridge stops 67. Now the cartridge lock knob 30 is rotated, thereby to rotate the eccentric 64 and to push down the cartridge locking mechanism 62 whereupon the cartridge is in the operating position. As a result the two pick-up heads 68 and 70 are in contact with the sound track on the film 140. The idler drum 71 has forced the idler rollers 153 and 154 apart against the force of the spring 158. Finally the clutch 97 is in engagement with the driver sprocket wheel 162.

The cartridge locking mechanism 62 has operated the switch bar 76 to close the microswitch 47 by engagement with the actuator 47a, the bar having been moved into dotted line position 76a as shown in FIG. 6. Hence when the start button 28 is depressed, the machine will start to operate. Now light will be projected from the lamp 78, mirror 81 through a film frame, the lens 92 onto the mirror 40 and the screen 23. The focus may be adjusted by the focus knob 32 as previously explained. This will simply move the lens assembly 82 up or down through the worm gears 84, 85.

At the same time the film is pulled at a continuous speed by the driven sprocket wheel 161 past the two pick-up heads 68 and 70. The idler drum 71 maintains the film 140 in frictional engagement with the idlers 153, 71, 154 to prevent slippage of the film. The flywheel 72 prevents sudden changes of the film speed which would deleteriously influence the quality of the sound reproduction.

The drive sprocket 162 pulls the film in a horizontal direction past the picture gate 77. As shown, there is only a small film loop on both sides of the aperture plate 175, that is, after the film passes the sprocket 161 and before the film passes the sprocket 162. However, since the film is positively driven before entering and after leaving the film gate, there is no need for a large film loop to accommodate the intermittent film movement and the continuous film drive.

The framing of the picture may be adjusted with the framing knob 33. This will rotate the framing bar 125 and hence rotate the claw 103 with respect to the longitudinal opening 180 thereby to move the projected picture image up or down into the proper position.

It should be noted that the pulley 57 is driven at the proper speed so that the shutter 100 and the claw cam 102 rotate together once as long as each film frame is held stationary. This will also cause the claw 103 to move the film again at the end of this period. On the other hand the clutch 97 is driven at a different speed to cause the film to move continuously at the rate of 20 feet per minute.

There has thus been disclosed a film projector adapted to cooperate with a film cartridge holding a continuous loop of film. The projector has an idler drum rotatably mounted together with a flywheel and adapted to be frictionally engaged with a pair of spring-biased idler wheels in the cartridge. This will provide sufficient friction so that the film can be smoothly pulled past the sound pick-up head. At the same time the inertia of the flywheel mass will prevent sudden changes of the film speed thus assuring the fidelity of the sound reproduction. The film is positively driven ahead of and beyond the film gate by a sprocket wheel in the film cartridge which in turn is driven by a clutch in the projector. This provides a simplified and positive film drive.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims.

I claim:

1. A projector for projecting motion picture film and for reproducing a sound track on the film, the film having sprocket holes and being contained in a film cartridge in a continuous loop, said projector comprising:
    (a) a housing having an aperture for receiving the film cartridge into an operative position therein, the cartridge having front portion means defining a first film path for reproducing the sound track on the film and in which idler wheel means guides the film, and said front portion means further defines a second film path for projecting film frames and in which a sprocket wheel drivingly engages the film;
    (b) a rotatable idler drum in said housing operable with said idler wheel means in the received operative position of the cartridge to tension the film in the first path; and
    (c) power means in said housing including a single clutch operably engaged with the sprocket wheel in the received operative position of said cartridge to drive the film in said second film path; said clutch being the only driving means for continuously driving the film in the cartridge and having parts engaged with the sprocket wheel in response to movement of the cartridge to its operative position.

2. A projector as defined in claim including a claw in said housing having fingers, and means driven by said power means for actuating the fingers to intermittently engage the sprocket holes in the film and advance the film intermittently in said second film path.

3. A projector as defined in claim 2, including a shutter in said housing and being disposed in said second film path for periodically obscuring the light passing through the film frames, said shutter being driven by said power means, and a cam rotatable with said shutter having a groove therein cooperative with a ball follower member carried by said claw for periodically lifting said claw fingers into the sprocket holes and for moving said claw fingers when engaging the sprocket holes to advance the film.

4. A projector as defined in claim 1, wherein said clutch has a frusto-conical outer end for engagement with a complementary end portion of the drive sprocket wheel in the cartridge.

5. A projector as defined in claim 1, wherein a flywheel is provided in said housing, said flyweel being connected to said idler drum for rotation therewith, thereby to provide a mass connected to said idler drum and having sufficient inertia to substantially prevent sudden variations of the film speed when driven by said sprocket wheel.

References Cited

UNITED STATES PATENTS

| Re 22,363 | 8/1943 | Miller et al. | 352—78 |
| 2,893,287 | 7/1959 | Lunzer | 352—196 |
| 3,152,741 | 10/1964 | Jorgensen | 352—194 XR |
| 3,271,095 | 9/1966 | Jensen et al. | 352—34 |
| 3,375,054 | 3/1968 | Hughes | 352—128 XR |
| 3,375,055 | 3/1968 | Hughes | 352—128 XR |

NORTON ANSHER, Primary Examiner

D. S. STALLARD, Assistant Examiner

U.S. Cl. X.R.

352—34, 72, 126, 166

UNITED STATES PATENT OFFICE
CERTIFICATE OF CORRECTION

Patent No. 3,544,205   Dated December 1, 1970

Inventor(s) M. J. Bogdanowicz

It is certified that error appears in the above-identified patent and that said Letters Patent are hereby corrected as shown below:

Column 5, line 14, for "pass" read --past--

Claim 2, line 52, for "claim including" read --claim 1 inc ing--

Signed and sealed this 15th day of June 1971.

(SEAL)
Attest:

EDWARD M. FLETCHER, JR.
Attesting Officer

WILLIAM E. SCHUYLER, JR.
Commissioner of Patents